Oct. 25, 1955    A. C. PETERSON ET AL    2,721,527
LUBRICANT LEVEL GAUGING MEANS FOR SEWING MACHINE
Filed Feb. 20, 1951    5 Sheets-Sheet 1

INVENTORS.
ALBERT C. PETERSON
GEORGE SAUER
BY H. C. Dieserud
ATTORNEY.

Oct. 25, 1955  A. C. PETERSON ET AL  2,721,527
LUBRICANT LEVEL GAUGING MEANS FOR SEWING MACHINE
Filed Feb. 20, 1951  5 Sheets-Sheet 2

INVENTORS.
ALBERT C. PETERSON
GEORGE SAUER
BY *H. C. Dresen*
ATTORNEY.

Oct. 25, 1955 A. C. PETERSON ET AL 2,721,527
LUBRICANT LEVEL GAUGING MEANS FOR SEWING MACHINE
Filed Feb. 20, 1951 5 Sheets-Sheet 3

INVENTORS.
ALBERT C. PETERSON
GEORGE SAUER

BY H. C. Dresend

ATTORNEY.

Oct. 25, 1955  A. C. PETERSON ET AL  2,721,527
LUBRICANT LEVEL GAUGING MEANS FOR SEWING MACHINE
Filed Feb. 20, 1951  5 Sheets-Sheet 4
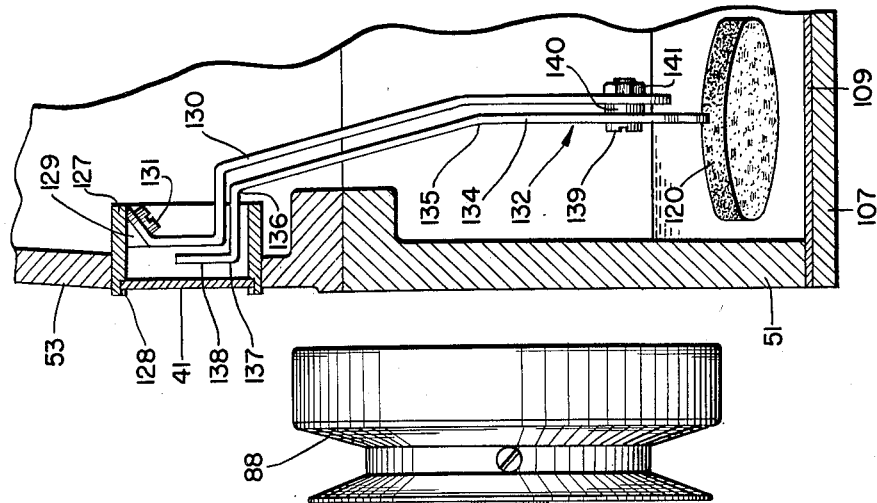
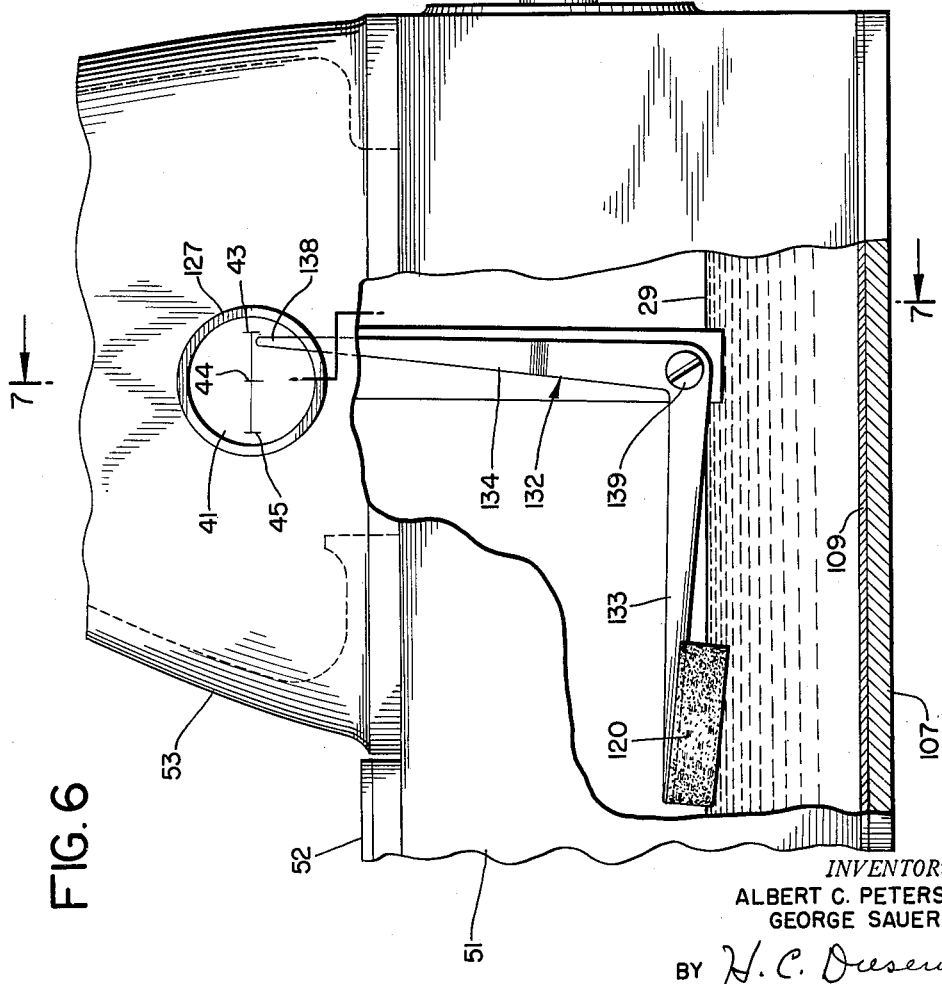
INVENTORS.
ALBERT C. PETERSON
GEORGE SAUER
BY H. C. Dresser
ATTORNEY.

Oct. 25, 1955     A. C. PETERSON ET AL     2,721,527
LUBRICANT LEVEL GAUGING MEANS FOR SEWING MACHINE

Filed Feb. 20, 1951     5 Sheets-Sheet 5

*INVENTORS.*
ALBERT C. PETERSON
GEORGE SAUER
BY
ATTORNEY.

United States Patent Office 2,721,527
Patented Oct. 25, 1955

2,721,527

LUBRICANT LEVEL GAUGING MEANS FOR SEWING MACHINE

Albert C. Peterson, Park Ridge, and George Sauer, Berwyn, Ill., assignors to Union Special Machine Company, Chicago, Ill., a corporation of Illinois Application February 20, 1951, Serial No. 211,932

1 Claim. (Cl. 112—256)

This invention relates to sewing machines and, more particularly, to the provision of gauging means in such machines for readily indicating the level of liquid lubricant contained in reservoirs provided in the machines.

It is a primary object of the invention to provide gauging means for readily and accurately indicating visually the level of liquid lubricant contained in a reservoir within a hollow portion of the frame of a sewing machine.

Another object of the invention is to provide, in a sewing machine, a float type gauge that includes a viewing window or dial, and a float-controlled indicator so arranged as to enable the operator of the machine to view the indicator at all times. This arrangement permits the operator to readily ascertain the level of lubricant within the lubricant reservoir even when the machine is submerged in a table board, with its base positioned in an opening provided therefor, so that the top of the cloth plate of the machine is substantially flush with the upper surface of the table board.

Another object of the invention is to provide a lubricant level gauge for sewing machines, which gauge is adapted to be quickly and easily installed or replaced as a substantially complete unit, or serviced as required, without disturbing the driving means and associated parts of the machine that are contained in the frame.

A further object of the invention resides in providing a sewing machine with a float type gauge that includes a baffle unit for minimizing liquid turbulence in the region of the gauge float, whereby the gauge will give a steady and correct indication of the level of a liquid lubricant contained in a reservoir located in the frame of the machine.

The invention has for a still further object the provision of gauges of the character indicated that are simple and compact in construction, that are reasonable in manufacturing and maintenance costs, and that are capable of performing their intended functions in a dependable and efficient manner.

To the end that the foregoing objects may be attained, a sewing machine constructed in accordance with this invention comprises a frame that is at least partially hollow and that includes a hollow base which defines a reservoir for containing a supply of a liquid lubricant. The machine has stitch forming devices and work feeding devices carried by the frame. These devices are operated by suitable actuating means that include a rotary driving shaft which is located in the base.

The machine is provided with means for transmitting lubricant from the reservoir to various actuating means within the frame in response to rotation of the driving shaft. The machine is also provided with the usual cloth plate or work support which may be considered as constituting a wall of the frame. Positioned at a convenient location in the cloth plate or in a side wall of the machine substantially wholly above the cloth plate, is a transparent viewing window or dial. A bracket is located wholly within the hollow portion of the frame and may be connected directly to the window or to a part of the frame other than the window. One recommended form of construction contemplates the use of an L-shaped lever that is also wholly within the frame. This lever comprises an upstanding arm and a generally horizontally extending arm, the latter arm being connected at its free end to a float. The lever is pivoted at the juncture of its arms to the bracket. The parts are so constructed and arranged that the upper portion of the upstanding arm serves as an indicator that is visible through the window, and variations in the level of the lubricant are represented by the position of the indicator with respect to graduations provided on the window.

In the foregoing construction, movement of the float and the lever arms may be considered as being arcuate. It is also within the purview of this invention to restrict the float to movement along a vertical path, and to provide an indicator adjacent the window, which indicator is pivotal relative to the frame in response to corresponding vertical movement of the float, as will be described in detail further along herein.

In the course of operating the sewing machine, the supply of liquid lubricant in the reservoir is more or less agitated, and the level thereof becomes turbulent, as distinguished from quiescent. This would normally cause rapid fluctuations of the indicator and would consequently make it difficult for the operator to determine the correct level of the lubricant. We overcome this difficulty by providing a stationary tubular baffle unit that substantially completely surrounds the float and that is in spaced relation thereto. The baffle unit extends above and below the normal upper and lower levels, respectively, of the lubricant, and effectively minimizes turbulence of the lubricant in the region of the float.

The lubricant level gauging means of this invention may be advantageously employed with various types of sewing machines including overedge sewing machines and flat bed sewing machines, such as lock or chain stitch sewing machines. The adaptability of the present invention to different types of sewing machines will be apparent from the detailed description that follows taken with reference to the annexed drawings.

The objects, features and advantages of the invention will be readily understood by persons skilled in the art upon consideration of the detailed description and several illustrative forms of the invention which will now be given, having reference to the accompanying drawings.

In the drawings, wherein like reference numerals denote corresponding parts throughout the several views:

Figure 6 is illustrative of another modification of the invention and corresponds to the lower right-hand portion of Figure 2, enlarged, parts being broken away for better illustration;

Figure 7 is a view taken along staggered line 7—7 of Figure 6 and illustrating the relative position of the parts when the lubricant reservoir is empty;

Figure 9:
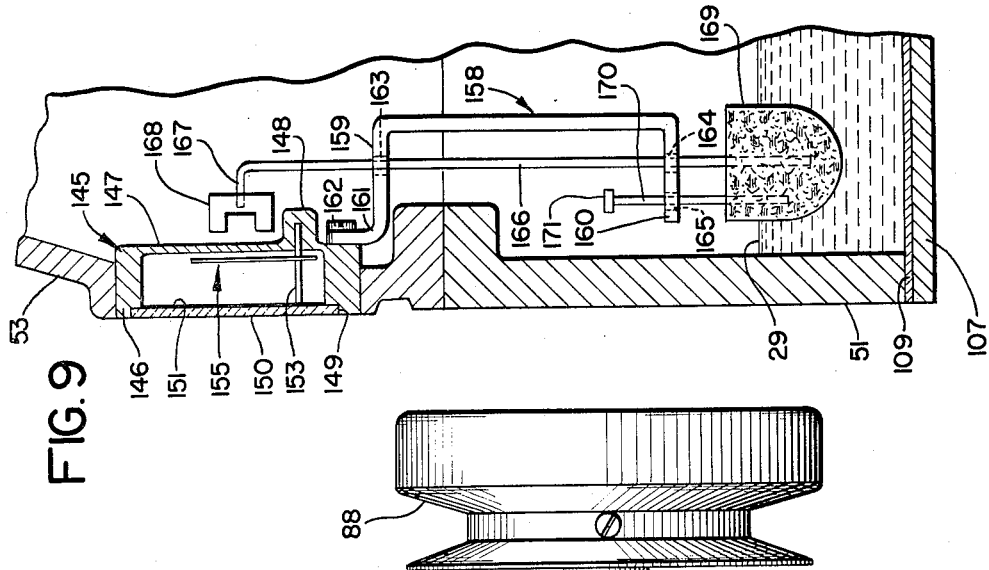
Figure 8:
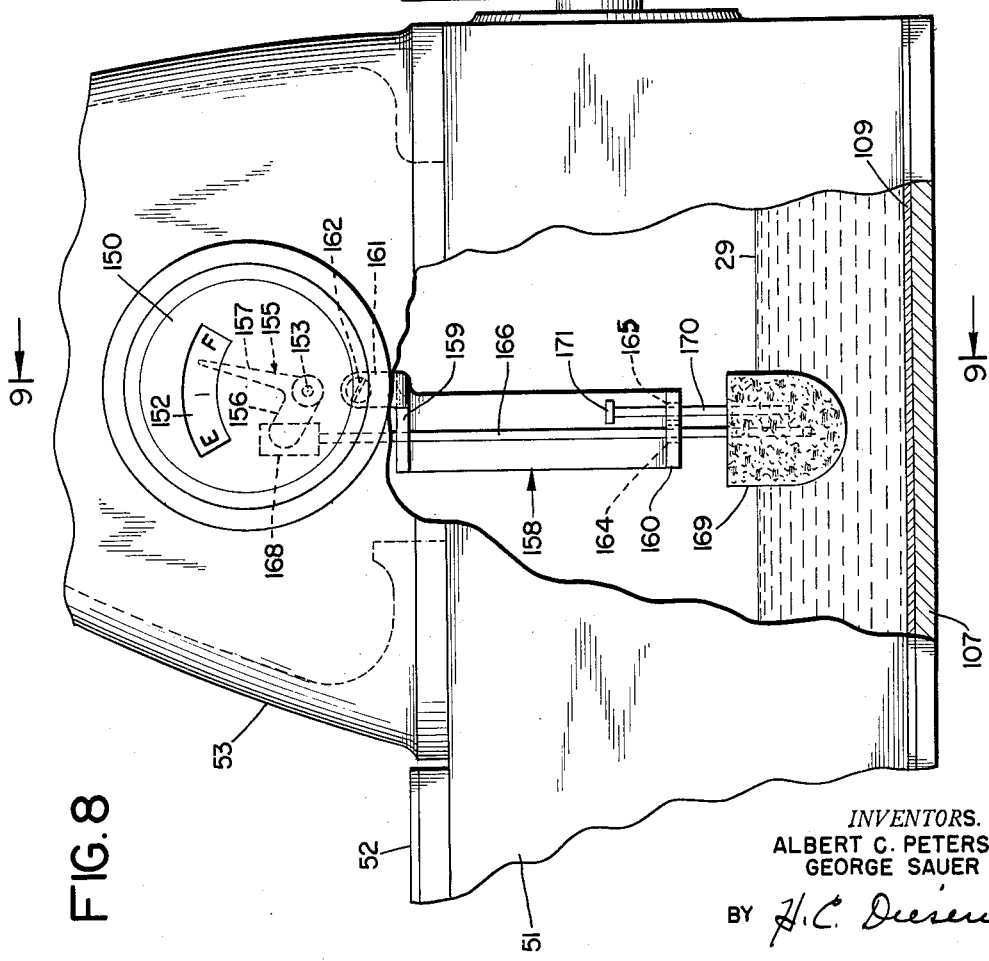

Figure 8 corresponds to Figure 6 and illustrates a further modification of the invention; and Figure 9 is a view taken along line 9—9 of Figure 8.

Figure 1:
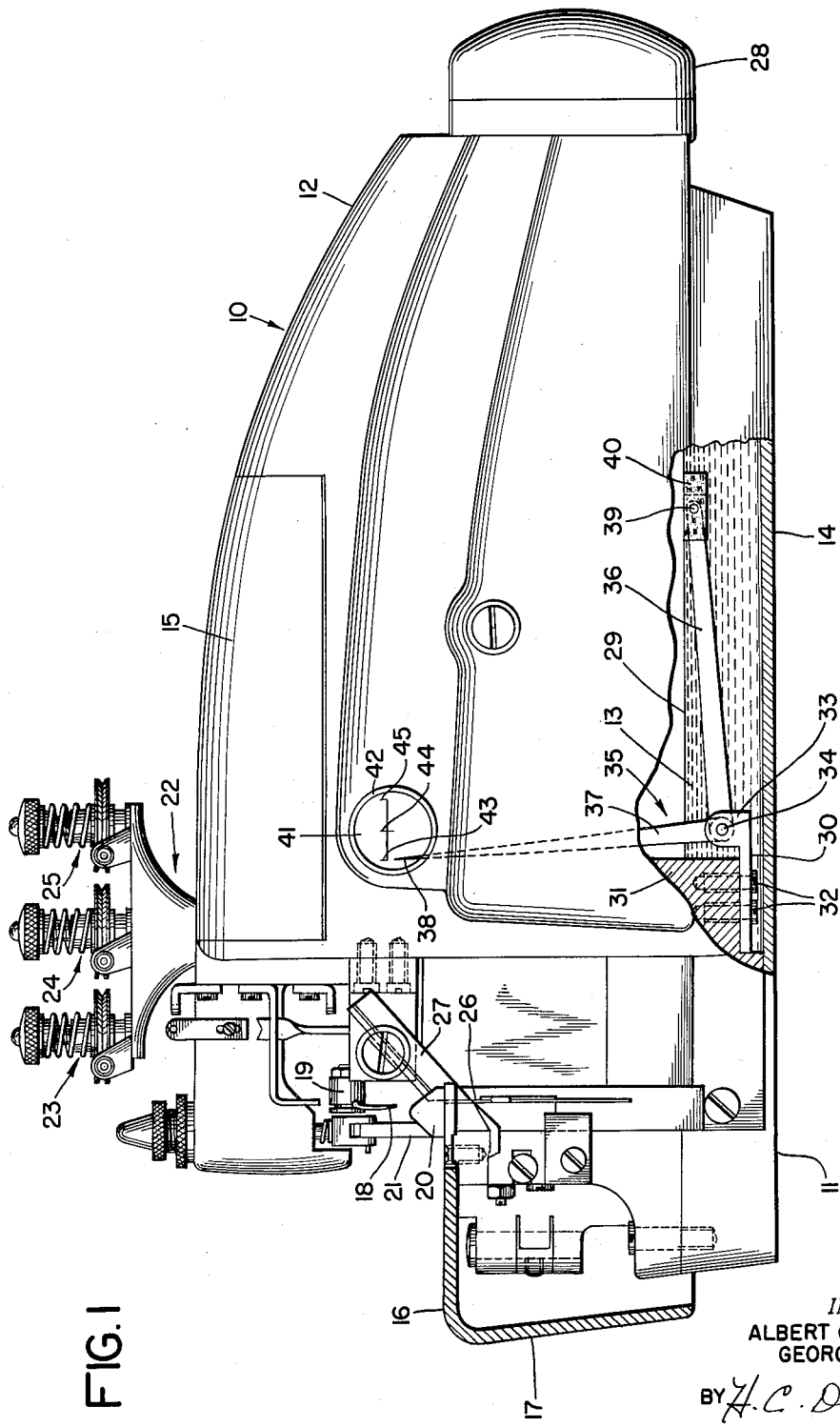
Figure 1 is a front elevational view of an overedge sewing machine constructed in accordance with this invention, parts being broken away and other parts being shown in section for purposes of better illustration.

Referring now to Figure 1 of the drawings, we have illustrated a sewing machine of the industrial type used in the production of either two or three thread overedge stitches along the free edges of a plurality of superposed pieces of work, or along the free edge of a single piece of work. The machine has a hollow frame 10 that comprises a base 11 and a curved sloping top 12. The base defines a lubricant reservoir or compartment 13 and has a removable bottom plate 14 that is maintained in place by a series of screws (not shown). The top is provided with a removable cover 15 that permits of ready access to actuating parts contained within the frame.

A cloth plate or work support 16, having an apron 17, normally conceals and protects the stitch forming and work feeding devices of the machine. Among such devices are a curved needle 18 carried at an end of a needle lever 19 and a presser foot 20 pivotally connected to the lower portion of a presser bar 21. Needle 18 is adapted to cooperate with an under looper (not shown) and a spreader (not shown), or an overedge looper (also not shown), in the formation of either two or three thread overedge stitches along the free edge of a piece of work. Mounted on and extending upwardly of the frame is a bracket 22 that supports three thread-tensioning devices 23, 24 and 25, for controlling the tension in thread delivered, respectively, to the needle, the overedge looper and the under looper.

The illustrated sewing machine also has a trimming mechanism for trimming the edge of the work in advance of the stitching operation. This mechanism includes a stationary trimming blade 26 and a movable blade 27. The devices for forming the stitches, for advancing the work, and for trimming the work, are actuated in unison by suitable mechanisms, including a drive shaft (not shown) which is driven by a combined hand wheel and pulley 28 that is located at the right hand end of the frame. These devices and mechanisms may be similar to, or the same as, corresponding devices and mechanisms disclosed in pending application of Ned L. Wallenberg, John G. Attwood and Edgar Schoij, Serial No. 196,104, filed November 17, 1950, and entitled "Overedge Sewing Machine," to which reference may be had for details of construction and operation.

The driving mechanisms within the frame and associated devices are lubricated by a liquid lubricant, such as a suitable oil, contained in reservoir 13. The level of the lubricating oil is indicated by reference numeral 29.

The particular form of liquid level gauge shown in Figure 1 comprises a bracket 30 that is removably attached to an internal frame lug 31 by screws 32. This bracket has a bifurcated upstanding arm 33 that carries a pivot pin 34. An L-shaped bell lever 35 consists of a generally horizontally extending arm 36 and an upstanding arm 37 that terminates at its upper end in an indicator, or pointer, 38. Lever 35 is mounted, at the juncture of arms 36 and 37, for pivotal movement about the axis of pin 34. The free end of arm 36 is pivoted, as indicated at 39, to a float member 40 that is preferably made of cork, or the like.

A window or dial 41 is supported in the front wall of frame 10, opposite indicator 38, by a support ring or tube 42 which extends through that wall. Window 41 is made of any suitable transparent material, including glass, or an appropriate synthetic resinous material, such as methyl methacrylate, and is graduated as indicated at 43, 44 and 45, whereby corresponding positions of the upper extremity of indicator 38 will indicate whether the reservoir is, respectively, full, one-half full, or empty. As illustrated, window 41 is disposed wholly above the upper surface of cloth plate 16. Thus, the window and indicator 38 are visible at all times, whether the machine is mounted on top of a support or is positioned in a conventional table board so that the upper surface of the cloth plate is flush with the top of the table board.

When the reservoir is full, as shown in Figure 1, float 40 maintains lever 35 at the illustrated angular position so that indicator 38 points to full graduation 43 on window 41. As the level of the lubricant falls in the reservoir, float 42 moves downwardly a corresponding distance, and lever 35 rotates to a corresponding extent in a clockwise direction.

The arrangement shown in Figure 1 permits the ready installation or removal of the complete gauge, with the exception of window 41, as a unit. It is merely necessary to remove bottom plate 14 to gain access to screws 32 for the removal and/or replacement of bracket 30 and parts carried thereby.

Figure 2:
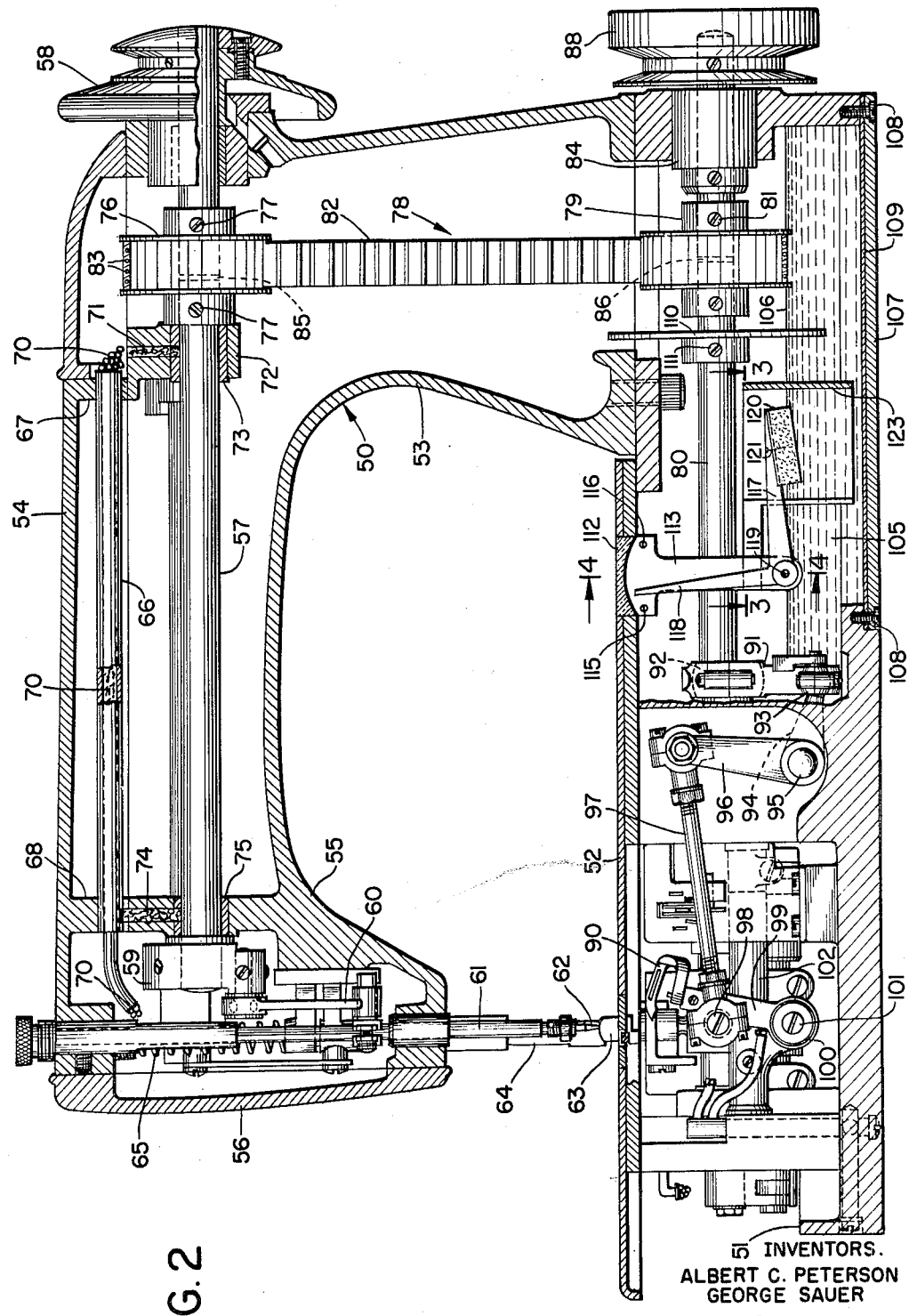
Figure 2 is a view in central longitudinal vertical cross-section of a flat bed sewing machine having a modified form of gauging means incorporated therein.

Figures 2 to 5 illustrate a modified form of construction wherein a gauging means constructed in accordance with the invention is employed with a flat bed sewing machine. The particular sewing machine shown in Figure 2 is in the nature of a 2-thread chain stitch machine. The frame of the machine is generally indicated by numeral 50 and comprises a hollow base 51 having a removable cover plate or work support 52 that constitutes a wall of the frame. Extending upwardly from and communicating with the interior of the base is a hollow vertical standard 53 that carries a hollow overhanging arm 54 which terminates in a hollow needle head 55. A removable cover plate 56 permits of ready access to the interior of the needle head.

Extending through the overhanging arm 54 is a first horizontal rotary driving shaft 57 that carries a combined hand wheel and pulley 58 at its outer end. The inner end of shaft 57 projects into the needle head and carries a crank 59 which is connected to the upper end of a pitman 60. The lower end of the pitman is joined by means of suitable connections to a vertical reciprocable needle bar 61 that carries a needle 62 at its lower extremity. A presser foot 63 is pivotally connected to the lower end of a presser bar 64 which is mounted for reciprocatory movement in the needle head and is normally urged downwardly by a compression spring 65.

Located in the overhanging arm and the needle head of the machine is a wicking arrangement for conducting adequate amounts of lubricating oil to devices in the needle head, and to various bearings for shaft 57. In this connection, a tube 66, supported in the overhanging arm by a frame extension 67 and a partition 68, contains wicking 70 for transmitting lubricating oil to the devices in the needle head; wicking 71 in a passage formed in a frame lug 72 and in a sleeve bearing 73 transmits lubricating oil to that bearing; and wicking 74, which constitutes a continuation of wicking 70 and which is located in a vertical passage in partition 68 and in a second sleeve bearing 75, delivers lubricating oil to bearing 75. Lubricating oil is supplied to the wicking in a manner to be described further along herein.

A pulley 76 is attached to shaft 57 by set screws 77 and is engaged by an open belt 78 that also engages a second pulley 79 which is secured to a second rotary driving shaft 80 by set screws 81. Belt 78 comprises a molded continuous band 82, made of a suitable oil resistant synthetic rubber, and a series of reinforcing stranded wires 83 that are embedded in the band.

As shown in Figure 2, shaft 80 is positioned in the frame base and is parallel to shaft 57. Further, shaft 80 is mounted for rotation in suitable bearings, including a sleeve bearing 84. Each of shafts 57 and 80 is preferably split, as indicated at 85 and 86, respectively, to facilitate initial installation and subsequent removal or replacement of the belt. A pulley 88 is secured to the outer end of shaft 80. Either pulley 58 or pulley 88 may be used to drive the machine by connecting the selected one by means of a belt (not shown) to a suitable source of power, such as an electric motor (not shown).

Cooperating with the needle, when it is beneath the cloth plate, is a thread-carrying looper 90 that is adapted to form with the needle what may be termed a 2-thread chain stitch. The looper and associated parts are actuated in response to rotation of shaft 80. Such parts are similar to corresponding parts disclosed in pending application of Albert C. Peterson and Clarence C. Smith, Serial No. 148,101, filed March 7, 1950, and entitled "Needle Feed Sewing Machines," and include a pitman 91 that engages an eccentric 92, carried by shaft 80, and a ball pin 93 that is carried at the end of a rock arm 94 which is rockable about the axis of a rock shaft 95. Also rockable about the axis of shaft 95 is an upstanding rock arm 96 that is pivotally connected at its upper end to one end of a link 97. The other end of link 97 is connected to a spherical end portion 98 of a member, otherwise not shown, that is connected to a looper carrier 99. The lower end of carrier 99 is provided with a sleeve 100 that is rockably mounted on a bolt 101 which is connected to a rock shaft 102. The above identified parts coact with other parts (not shown) to effect four-motion movement to the looper and corresponding movement to a four-motion feed dog (not shown). For further details of construction and a full understanding of the operation of the looper and feed dog, reference is had to said Peterson and Smith application.

The frame base defines a reservoir or compartment 105 for containing a supply of lubricating oil, the level of the oil being indicated at 106. The base has a bottom plate 107 removably maintained in position by screws 108. A gasket 109 is interposed between the base casting and the bottom plate to prevent leakage of the lubricating oil. A splasher or spraying ring 110 is secured to shaft 80 by a set screw 111. The spraying ring and the lower portion of belt 78 extend into the body of the lubricating oil. Thus, upon rotation of shaft 80, the spraying ring picks up lubricant and transmits it in the form of a spray or mist upwardly through standard 53 and into overhanging arm 54. Also, belt 78 conveys particles of oil into the overhanging arm whereby the wicking receives and becomes saturated with the oil and transmits the same to various actuating devices in the overhanging arm and in the needle head.

A gauge window or dial 112 is positioned in and forms a hermetical seal with cloth plate 52. This window is preferably circular in plane top configuration and its upper surface is flush with the exposed surface of cloth plate 52. Additionally, window 112 is preferably made of the same material as window 41 and has similar graduations (not shown). Depending from window 112 is a pair of parallel arms 113 that are spaced apart, as indicated at 114 in Figure 4. Spaced indicator stop pins 115 and 116 are carried by one or both of these arms below the window (Figure 2).

An L-shaped lever, consisting of a generally horizontally extending arm 117 and an upstanding indicator arm or pointer 118, is pivotally mounted at the juncture of its arms on a pin 119 that is carried by arms 113. The portion of arm 117, remote from arm 118, registers with a groove in the top of a cylindrical float member 120 and is attached to the float member by a wire, or the like, 121. Float member 120 may be made of cork, or other suitable material.

Figure 3:
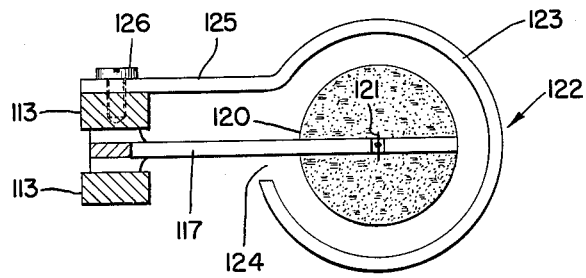
Figure 3 is a view in enlargement taken along line 3—3 of Figure 2.
Figure 4:
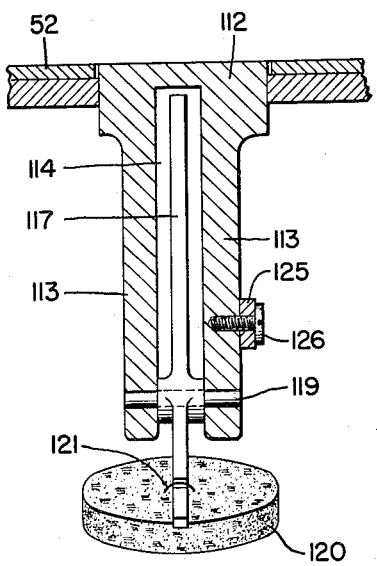
Figure 4 is a view in enlargement taken along line 4—4 of Figure 2.
Figure 5:
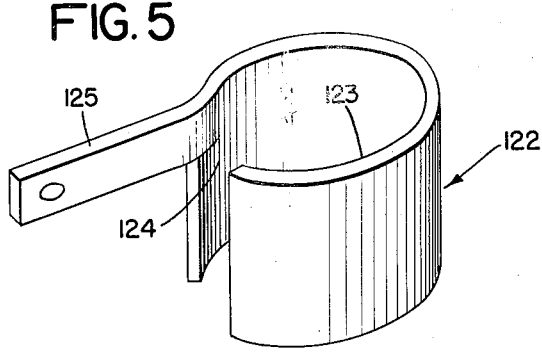
Figure 5 is an isometric view of the baffle unit shown in Figures 2 and 3.

Reference is next had to Figures 2, 3 and 5 for an understanding of the construction of a baffle unit, generally denoted by numeral 122. This unit comprises an upstanding tubular member 123 adapted to freely accommodate float member 120 and split longitudinally to provide an opening 124 for the free reception of lever arm 117. Integral with the tubular member is a horizontal arm 125 that is attached to one of arms 113 by a screw 126 (Figure 3).

Tubular member 123, as shown in Figure 2, extends above and below the normal upper and lower levels, respectively, of the body of lubricating oil. It will be apparent from a consideration of Figure 2 that belt 78, spraying ring 110 and other moving parts within the base, cause, during operation of the machine, agitation and turbulence of the body of lubricating oil. The interior of the tubular member constitutes a zone of quiescence, thereby substantially completely eliminating turbulence therewithin. As a result, the float and the L-shaped arm are not materially affected by lubricant turbulence exterior the tubular member, and pointer 118 will give a true and steady indication of the level of the lubricant.

While a flat bed sewing machine, such as the one shown in Figure 2, may be mounted on top of a suitable support, it is usually mounted in a table board with its base submerged in an opening provided in the board so that the upper surface of cloth plate 52 is level with the top of the board. In either case, window 112 is exposed to the view of the operator and indicator arm 118 may be readily observed by the operator through the window.

Figures 6 and 7 illustrate another modification of the invention that is similar in many respects to the constructions shown in the earlier described forms of the invention. In this modification, a tubular support 127 extends through an opening provided in the front wall of hollow standard 53, above the top of cloth plate 52. The support has an annular groove 128 at its outer end for the reception of window or dial 41, and is provided with an internal lug 129 to which a bracket 130 is secured by means of one or more screws 131. A generally L-shaped lever 132, consisting of a generally horizontally extending float arm 133 and an upstanding arm 134, is pivoted to the lower end of bracket 130 by a bolt 139, but is maintained in spaced relation to the bracket by a spacer sleeve 140 (Figure 7). The bracket and lever are retained in assembled relation by nut 141 engaging bolt 139. Arm 134 is bent, as indicated at 135, 136 and 137, and terminates in a pointer or indicator portion 138 which is disposed in tubular support 127 adjacent to the inner surface of window 41. Bracket 130 is similarly bent.

The float and lever of this modification operate in the same manner as the corresponding parts shown in Figure 1 to indicate the level of the lubricant in its reservoir. This modification, as well as the other forms of construction shown in the drawings and described herein, may, if desired, be provided with a baffle unit of the type shown in Figures 2, 3 and 5.

Referring now to Figures 8 and 9, the modification of the invention illustrated therein includes a housing 145 that is made of aluminum, or other suitable material that is substantially transparent to magnetic lines of force. Housing 145 comprises a circular tubular side wall 146 positioned in an opening that extends through the front wall of hollow standard 53 above the upper surface of cloth plate 52, and an integral rear wall 147 that has a rearward extension or lug 148. The outer end of wall 146 has an annular groove in which a window or dial 150 is disposed in sealed relation to that wall. Window 150, as in the case of the earlier described windows, is made of a transparent glass or suitable plastic, and is preferably provided with an inner coating of a suitable light opaque material 151, except for the arcuate portion indicated by numeral 152 (Figure 8). The arcuate portion of the window may be graduated with letters and a line as shown, letters "F" and "E," respectively, representing full and empty conditions of the lubricant reservoir, while the line midway between these letters represents the one-half full condition of the reservoir. A pin 153 extends across the interior of the housing and is supported, at least at its inner end, in housing lug 148. Mounted on and pivotal about the axis of pin 153 is an indicator 155. This indicator is made of a suitable magnetic material and consists of a first arm 156 and a second arm, or pointer, angularly disposed with respect to the first arm.

A generally U-shaped bracket 158 includes spaced parallel arms 159 and 160. Arm 159 has an upstanding extension 161 for connecting the bracket to the housing with the aid of a screw 162. Arms 159 and 160 are provided with vertically aligned through openings 163 and 164, respectively. Arm 160 is provided with an additional opening 165 that is spaced from opening 164. A rod 166, preferably made of aluminum, is slidable through openings 163 and 164. This rod is bent at its upper end to obtain a forwardly projecting lateral extension 167 that carries a permanent magnet 168. The magnet is positioned adjacent the rearward surface of housing wall 147 and is aligned with indicator arm 156, the parts being so constructed and arranged that the indicator arm is subject to the action of the magnet. A float member 169, made of cork or the like, is anchored to the lower end of rod 166. Also anchored in the float member is a second rod 170 having a head 171. Rod 170 is parallel to rod 166 and extends through opening 165. Rod 170 permits of vertical movement of float member 169, rod 166 and magnet 168, but prevents rotational movement thereof.

It will be apparent from an examination of Figures 8 and 9 that as lubricant is consumed by the sewing machine, lubricant level 29 will fall and float 169, rod 166 and magnet 168 are lowered a corresponding extent within the sewing machine frame. Inasmuch as indicator arm 156 is subjected to the lines of magnetic force emanating from magnet 168, indicator 155 will be correspondingly pivoted in a counterclockwise direction about the axis of pin 153, as viewed in Figure 8. Thus, as the float is raised or lowered within the frame, indicator 155 is correspondingly pivoted about the axis of pin 153, and variations in the level of the lubricant are readily determined by observing the upper end of indicator pointer 157 through arcuate exposed portion 152 of the window.

From the foregoing it is believed that the construction, operation and advantages of each of the several forms of our present invention, herein shown and described, will be readily apparent to persons skilled in the art. It is to be clearly understood, however, that various changes in the forms of apparatus set forth above may be made without departing from the scope of the invention, it being intended that all matter contained in the description, or shown in the drawings, shall be interpreted as illustrative only and not in a limiting sense.

I claim:

In a sewing machine, a frame including a base, said frame being hollow, said base defining a reservoir for containing a supply of a liquid lubricant, a cloth plate carried by and constituting a wall of said frame, stitch forming devices carried by said frame, actuating means including a rotary driving shaft in said base for operating said devices, means for transmitting lubricant upon rotation of said shaft to said actuating means, a transparent window in an upstanding outer wall of said frame and positioned at least at the level of said cloth plate, an upstanding tubular baffle member positioned in and secured to said frame, said baffle member extending beyond the normal upper and lower levels of said lubricant and having a longitudinal through opening, a float member adapted to be buoyed by said lubricant, said float member being positioned within and spaced from the inner surface of said baffle member, a support in said frame, a lever within said frame and pivotally connected intermediate its ends to said support, said lever comprising an upstanding arm and a generally horizontally disposed arm that extends through said opening in said baffle member and is connected at its free end to said float, at least a portion of said upstanding arm being visible through said window, said window having such horizontal width as to permit a portion of the upstanding arm to be visible between the empty and full conditions of the reservoir.

References Cited in the file of this patent

UNITED STATES PATENTS

| | | |
|---|---|---|
| 704,442 | Doellinger | July 8, 1902 |
| 907,657 | Webster | Dec. 22, 1908 |
| 979,799 | Pritchard | Dec. 27, 1910 |
| 1,950,142 | Hastings et al. | Mar. 6, 1934 |
| 2,206,285 | Kaier | July 2, 1940 |
| 2,247,570 | Clayton | July 1, 1941 |
| 2,301,460 | Sauer | Nov. 10, 1942 |
| 2,372,175 | Christensen | Mar. 27, 1945 |
| 2,596,728 | Sauer et al. | May 13, 1952 |

FOREIGN PATENTS

| | | |
|---|---|---|
| 334,569 | Germany | Mar. 15, 1921 |